United States Patent
Yao et al.

(10) Patent No.: US 10,179,515 B2
(45) Date of Patent: Jan. 15, 2019

(54) SYSTEM FOR CHARGING BATTERY OF ELECTRIC VEHICLE INCLUDING A CONTROLLER CONNECTED TO AT LEAST ONE SWITCH

(71) Applicant: ABB Schweiz AG, Baden (CH)

(72) Inventors: Dawei Yao, Beijing (CN); Xiaobo Yang, Beijing (CN); Chunming Yuan, Beijing (CN); Chao Yang, Beijing (CN)

(73) Assignee: ABB Schweiz AG, Baden (CH)

( * ) Notice: Subject to any disclaimer, the term of this patent is extended or adjusted under 35 U.S.C. 154(b) by 227 days.

(21) Appl. No.: 15/175,733

(22) Filed: Jun. 7, 2016

(65) Prior Publication Data

US 2016/0362012 A1    Dec. 15, 2016

Related U.S. Application Data

(63) Continuation of application No. PCT/CN2014/083420, filed on Jul. 31, 2014.

(51) Int. Cl.

| | |
|---|---|
| *H01M 10/46* | (2006.01) |
| *B60L 11/18* | (2006.01) |
| *H02J 7/00* | (2006.01) |
| *H02J 7/02* | (2016.01) |
| *H02M 7/04* | (2006.01) |

(52) U.S. Cl.
CPC ......... *B60L 11/1811* (2013.01); *H02J 7/0027* (2013.01); *H02J 7/022* (2013.01); *H02M 7/04* (2013.01); *Y02T 10/7055* (2013.01)

(58) Field of Classification Search
CPC ......... H02J 7/0052; H02J 7/0027; H02J 7/022
USPC ........ 320/107, 138, 140; 307/43, 45, 54, 58, 307/61
See application file for complete search history.

(56) References Cited

U.S. PATENT DOCUMENTS

2005/0151517 A1*   7/2005   Cook ..................... B60R 16/03
                                                          323/207
2013/0320754 A1*  12/2013   Edelbrock ............. H02M 5/271
                                                            307/9.1

FOREIGN PATENT DOCUMENTS

| CN | 1877952 A | 12/2006 |
| CN | 102025182 A | 4/2011 |

(Continued)

OTHER PUBLICATIONS

Extended European Search Report dated Nov. 27, 2017 in corresponding European application No. 14898738.1 (8 pages).

(Continued)

*Primary Examiner* — Edward Tso
(74) *Attorney, Agent, or Firm* — Taft Stettinius & Hollister LLP (57) ABSTRACT

The application relates to a system for charging a battery of an electrical vehicle. The electrical vehicle charging system of the present application is helpful for decreasing the converter capacity while maintaining the charging capacity and electrical vehicles with various nominal voltages can be charged simultaneously. In one aspect the system for charging an electrical vehicle includes: a plurality of central converters, at least one switch electrically connected to the central converters, at least one transformer electrically connected to an external AC power supply, at least one distributed converter for supplying at least one distributed DC voltage with a level below that of the central converter, and a controller connected to the at least one switch.

12 Claims, 5 Drawing Sheets

(56) References Cited

FOREIGN PATENT DOCUMENTS

| CN | 103219764 A | 7/2013 |
| CN | 103795132 A | 5/2014 |
| JP | H05-276673 A | 10/1993 |
| JP | 2012-019602 A | 1/2012 |
| WO | 2012037722 A1 | 3/2012 |
| WO | 2012119300 A1 | 9/2012 |
| WO | 2013120966 A1 | 8/2013 |

OTHER PUBLICATIONS

IEC: IEC 61851-23, Electric vehicle conductive charging system—Part 23: DC electric vehicle charging station; Edition 1.0 Mar. 2014 (1 page).

State Intellectual Property Office of the P.R. China, International Search Report & Written Opinion issued in corresponding Application No. PCT/CN2014/083420, dated Jan. 6, 2015, 9 pp.

* cited by examiner

SYSTEM FOR CHARGING BATTERY OF ELECTRIC VEHICLE INCLUDING A CONTROLLER CONNECTED TO AT LEAST ONE SWITCH

TECHNICAL FIELD

The invention relates to the field of system for charging a battery of an electrical vehicle, and more particularly to a system for charging a battery of at least one electrical vehicle.

BACKGROUND ART

With the development of electrical vehicle (EV), EV chargers are designed and central charging stations are constructed globally for electrical vehicles. PCT application WO2012/119300 A1 discloses an EV charger unit. According to FIG. 1 of WO2012/119300 A1, standard IGBT bridges are adopted in EV charger unit for AC-DC conversions, and then DC-DC converters will be used to match the desired voltage level of batteries.

Figure 1:
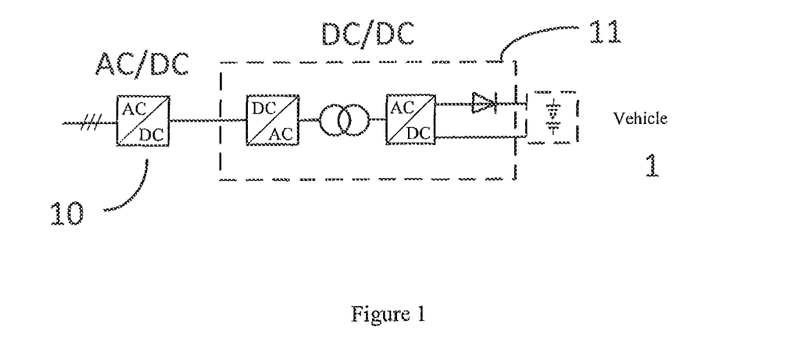
FIG. 1 is a block diagram showing a conventional EV charger unit by CHAdeMo.

FIG. 1 is a block diagram showing a conventional EV charger unit by CHAdeMo, Technical Specification of Quick Charger for Electric Vehicle, Jan. 31, 2012. As shown in FIG. 1, the EV charger unit 1 includes an AC/DC converter 10 and a DC/DC converter 11 that are linked in series.

Figure 2:
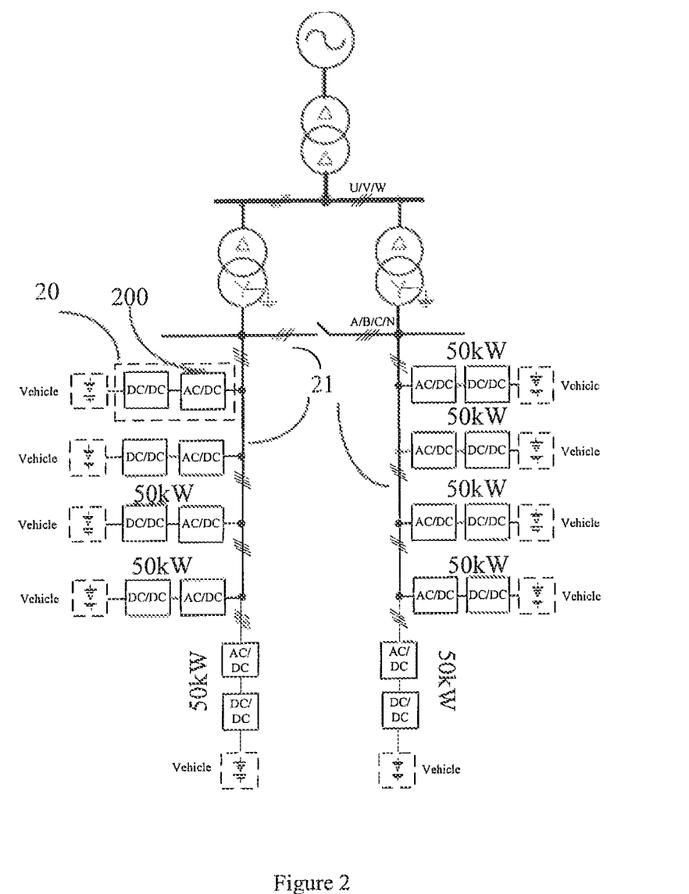
FIGS. 2 and 3 respectively show a conventional AC bus based EV charging station and a conventional DC bus based EV charging station.
Figure 3:
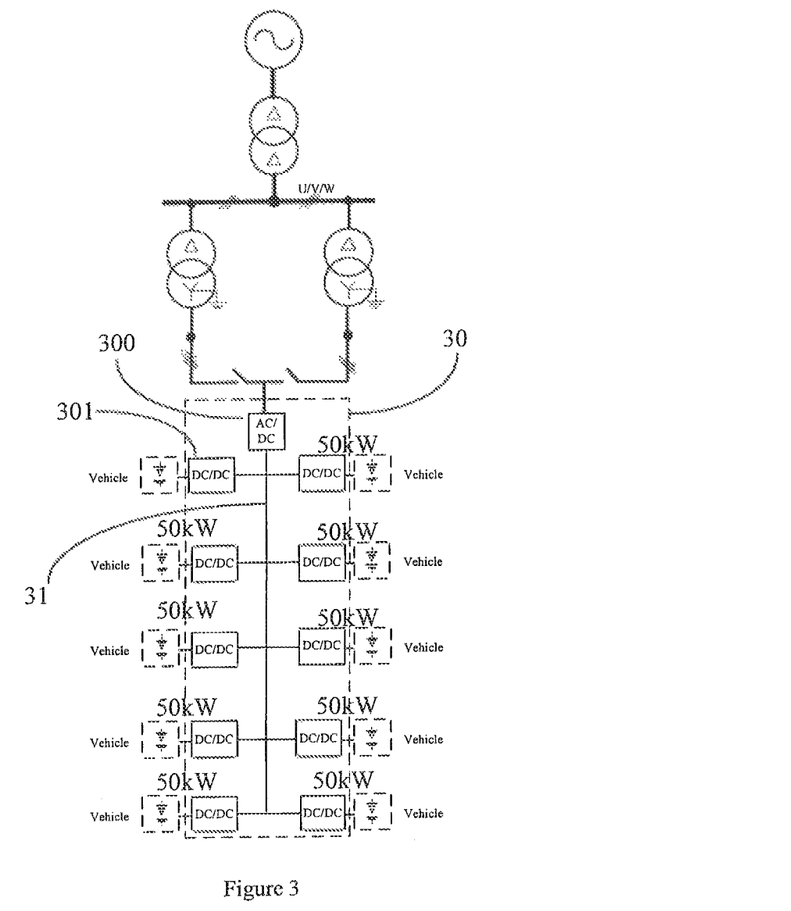

An EV charging station may comprise at least one EV charger unit so that it can charge the battery of at least one electrical vehicle. Dependent on the type of the bus bar, the EV charging station can be defined as two types: AC bus based station and DC bus based station. FIGS. 2 and 3 respectively show a conventional AC bus based EV charging station and a conventional DC bus based EV charging station. As shown in FIG. 2, the AC bus based EV charging station 2 includes at least one EV charger unit 20 that is coupled to the AC bus bar 21. The AC-DC converter 200 used in each EV charger unit 20 is called distributed AC/DC converter considering that they are distributed with the EV charger units 20 in the AC bus based EV charging station 2. Description concerning FIGS. 2 and 3 of WO2012/119300 A1 also teaches the AC bus based EV charging station. As shown in FIG. 3, the DC bus based EV charging station 3 includes at least one EV charger unit 30 that share the same AC/DC converter 300 but each of them comprises separate DC/DC converter 301. The input of the DC/DC converter 301 is coupled to the output of the AC/DC converter 300 via a DC bus bar 31. As compared with FIG. 2, in the DC bus based EV charging station, the AC/DC converter 300 is utilized to replace the distributed AC/DC converters 200 and thus it is called central AC/DC converter.

From both AC based and DC based EV charging station solutions, all converters used as EV charger are full-power converter. Take a 50 kW×6 charging station as an example, the total capacity of the converter system is 600 kW which is actually doubled (50 kW×6 for AC/DC stage, 50 kW×6 for DC/DC stage). The full power-converter brings high cost, high losses and large foot print/weight. Besides, to charge EV batteries with different nominal voltage levels, different chargers with various rated voltages should be designed and manufactured separately, which leads to an increased cost on product R&D and manufacture. This also limits the flexibility of EV charger operation. For example, EV chargers designed for electric passenger vehicles cannot be used to charge electric buses. And the efficiency of the chargers for electric buses will decrease if it is used to charge electric passenger vehicles.

BRIEF SUMMARY OF THE INVENTION

It is therefore an objective of the invention to provide a system for charging a battery of at least one electric vehicle, comprising: a plurality of central converters, each of the plurality of central converters having an AC input electrically connectable to an external AC power supply, each of the plurality of central converters having a DC output, and the DC outputs of the plurality of central converters being serially connected; at least one switch, each of the switches having a plurality of throw terminals being respectively electrically connected to terminals of the DC outputs of the plurality of central converters, each of the switches having two pole terminals, and each of the switches having an actuator for switching between electrical connection of one of the pole terminals and one of the plurality of throw terminals and that of the one of the pole terminals and another of the plurality of throw terminals so as to selectively supplying a voltage at a central DC output between the two pole terminals as a central DC voltage; at least one transformer, each of the transformers having a primary winding circuit and a secondary winding circuit, and the primary winding circuit being electrically connected to the external AC power supply; at least one distributed converter for supplying at least one distributed DC voltage with a level below that of the central converter, each of the distributed converters having an AC side electrically connected to the secondary winding circuit of the corresponding one of the transformers, each of the distributed converters having a DC side electrically connected to the central DC output of the corresponding switch in series; and a first controller connected to the at least one switch, so that the actuator of electrical connection between the pole terminal and the plurality of throw terminals of the respective one of the at least one switches is controlled so as to supply a combination of the central DC voltage and the distributed DC voltage as a charging voltage for the battery of the corresponding electric vehicle.

By having the EV battery charging system of present invention, it is helpful for decreasing the converter capacity while maintaining the charging capacity and vehicles with various nominal voltages can be charged simultaneously.

BRIEF DESCRIPTION OF THE DRAWINGS

The subject matter of the invention will be explained in more detail in the following text with reference to preferred exemplary embodiments which are illustrated in the drawings, in which.

The reference symbols used in the drawings, and their meanings, are listed in summary form in the list of reference

PREFERRED EMBODIMENTS OF THE INVENTION

Figure 4:
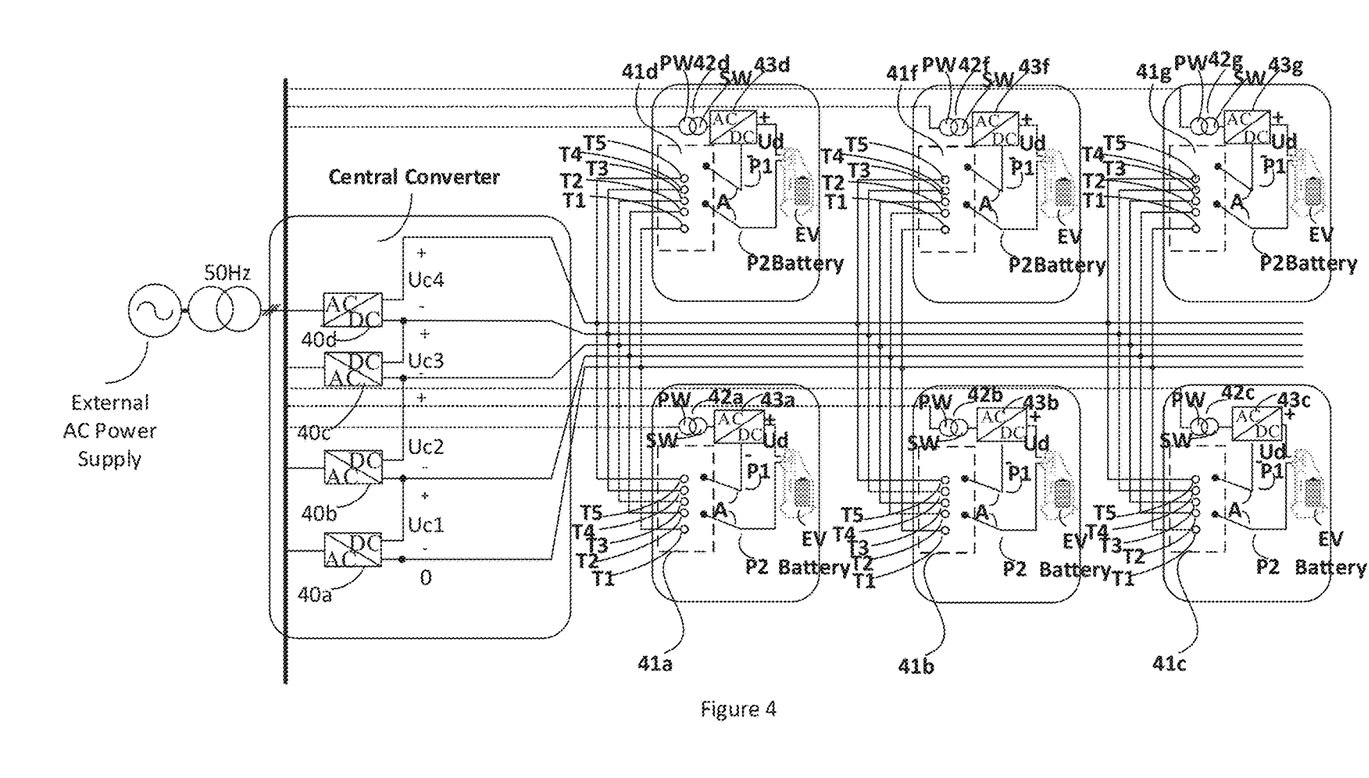
FIG. 4 illustrates an embodiment of a system for charging a battery of at least one electrical vehicle according to present invention.

FIG. 4 illustrates an embodiment of a system for charging a battery of at least one electrical vehicle according to present invention. As shown in FIG. 4, the system for charging a battery of at least one electric vehicle 4 comprises a plurality of central converters, for example four central converters 40a, 40b, 40c, 40d, at least one switch, for example six switches 41a, 41b, 41c, 41d, 41f, 41g, at least one transformer, for example six transformers 42a, 42b, 42c, 42d, 42f, 42g, at least one distributed converter, for example six distributed converters 43a, 43b, 43c, 43d, 43f, 43g, and a first controller.

The central converter can be a two-level voltage source converter (VSC) based on IGCT or IGBT configured as a full bridge, and each of its legs has two series-connected controllable switches. Each of the central converters 40a, 40b, 40c, 40d has an AC input electrically connectable to an external AC power supply, and the controllable switches of the central converter are used for controlling the commutation of the legs with certain switching pattern (for example. firing angle control, modulation index control, etc.) set by a second controller (not shown) to supply a output of a first DC voltage Uc1, Uc2, Uc3, Uc4 by rectifying the AC voltage from an external AC power supply. Preferably, the second controller is connected to the central converters 40a, 40b, 40c, 40d, and can control a switching pattern of each of the central converters so that at each of the outputs of the central converters 40a, 40b, 40c, 40d, a stable first DC voltage Uc1, Uc2, Uc3, Uc4 is supplied. This is helpful for maintaining the stability of the central DC voltage and thus improving the quality of EV battery charging voltage. In order to supply various central DC voltages Uc, for example as voltage base for the EV battery charging voltage, each of the central converters 40a, 40b, 40c, 40d has a DC output where the first DC voltage Uc1, Uc2, Uc3, Uc4 is supplied, and the DC outputs of the central converters 40a, 40b, 40c, 40d are serially connected. Therefore, by selecting a combination of the outputs of the central converters 40a, 40b, 40c, 40d, the central DC voltage Uc as the base for the EV battery charging voltage ranges from 0 to Uc1+Uc2+Uc3+Uc4. In particular, if none of the central converters 40a, 40b, 40c, 40d is selected, the EV battery charging voltage base is 0, if the central converter 40a is selected, the EV battery charging voltage base is Uc1, if the central converters 40a, 40b are selected, the EV battery charging voltage base is Uc1+Uc2, if the central converters 40a, 40b, 40c are selected, the EV battery charging voltage base is Uc1+Uc2+Uc3, and similarly if the central converters 40a, 40b, 40c, 40d are selected, the EV battery charging voltage base is Uc1+Uc2+Uc3+Uc4. The skilled person shall understand that any of the central converters 40a, 40b, 40c, 40d can be selected for supplying the EV battery charging voltage base, for example, selection of the central converters 40b for supplying EV battery charging voltage base Uc2, selection of the central converters 40c for supplying EV battery charging voltage base Uc3, selection of the central converters 40d for supplying EV battery charging voltage base Uc4. Besides, any two or three thereof which are serially connected can also be selected for supplying the EV battery charging voltage base, for example selection of the central converters 40b, 40c for supplying EV battery charging voltage base Uc2+Uc3, selection of the central converters 40b, 40c, 40d for supplying EV battery charging voltage base Uc2+Uc3+Uc4, selection of the central converters 40c, 40d for supplying EV battery charging voltage base Uc3+Uc4.

Each of the switches 41a, 41b, 41c, 41d, 41f, 41g has a plurality of pole terminals, throw terminals and actuator (a mechanical moving part that applies the force to contacts) being respectively electrically connected to terminals of the DC outputs of the central converters 40a, 40b, 40c, 40d. According to the actuator type, the switch can be mechanical switch (i.e. knife switch), chemical switch (i.e. mercury switch), light switch, electronic switch, etc. With the action of actuator, electrical connections between pole terminal and throw terminal can be formed in such kind of switch. For example, the switch 41a has two pole terminals P1, P2, and five throw terminals T1, T2, T3, T4, T5 respectively electrically connected to the five terminals O1, O2, O3, O4, O5 of the DC outputs of the central converters 40a, 40b, 40c, 40d, and the other switches 41b, 41c, 41d, 41f, 41g have similar connection structure with the central converters 40a, 40b, 40c, 40d. The five throw terminals T1, T2, T3, T4, T5 provide the means for selection of none or one of the first DC voltage Uc1, Uc2, Uc3, Uc4 or a combination of two, three, or four of them so as to supply the EV battery charging voltage base as described above. Consequently, the selection of none of the central converters 40a, 40b, 40c, 40d for supplying the EV battery charging voltage base can be achieved by selection of the throw terminal T1, the selection of central converter 40a for supplying the EV battery charging voltage base can be achieved by selection of two of the throw terminals T1, T2, the selection of central converters 40a, 40b for supplying the EV battery charging voltage base can be achieved by selection of two of the throw terminals T1, T3, the selection of central converters 40a, 40b, 40c for supplying the EV battery charging voltage base can be achieved by selection of two of the throw terminals T1, T4, and similarly the selection of central converters 40a, 40b, 40c, 40d for supplying the EV battery charging voltage base can be achieved by selection of two of the throw terminals T1, T5. The skilled person shall understand that any of the central converters 40a, 40b, 40c, 40d can be selected for supplying the EV battery charging voltage base, for example, the selection of central converter 40b for supplying the EV battery charging voltage base can be achieved by selection of two of the throw terminals T2, T3, the selection of central converters 40c for supplying the EV battery charging voltage base can be achieved by selection of two of the throw terminals T3, T4, the selection of central converters 40c for supplying the EV battery charging voltage base can be achieved by selection of two of the throw terminals T4, T5. Besides, any two or three thereof which are connected in series can also be selected for supplying the EV battery charging voltage base, for example, the selection of central converter 40b, 40c for supplying the EV battery charging voltage base can be achieved by selection of two of the throw terminals T2, T4, the selection of central converters 40b, 40c, 40d for supplying the EV battery charging voltage base can be achieved by selection of two of the throw terminals T2, T5, the selection of central converters 40c, 40d for supplying the EV battery charging voltage base can be achieved by selection of two of the throw terminals T3, T5. Each of the switches 41a, 41b, 41c, 41d, 41f, 41g has two pole terminals P1, P2 and an actuator A for switching between electrical connection of one of the pole terminals P1, P2 and one of the throw terminals T1, T2, T3, T4, T5 and that of the one of the pole terminals P1, P2 and another of the throw terminals T1, T2, T3, T4, T5 so as to selectively supply a voltage at a central DC output between the two pole terminals P1, P2 as a central DC voltage. For example, as shown in FIG. 4, the actuator A can electrically connect both of the pole terminals P1, P2 and the throw terminal T1, thus the central DC voltage Uc as the EV battery charging voltage base between the pole terminals P1, P2 is 0V; when the pole terminal P2 and the throw terminal T1 is electrically connected by the actuator A, the actuator A can electrically connect the pole terminal P1 and the throw terminal T2, thus the central DC voltage Uc as the EV battery charging voltage base between the pole terminal P1 and the pole terminal P2 is Uc1; when the pole terminal P2 and the throw terminal T1 is electrically connected by the actuator A, the actuator A can electrically connect the pole terminal P1 and the throw terminal T3, thus the central DC voltage Uc as the EV battery charging voltage base between the pole terminal P1 and the pole terminal P2 is Uc1+Uc2; when the pole terminal P2 and the throw terminal T1 is electrically connected by the actuator A, the actuator A can electrically connect the pole terminal P1 and the throw terminal T4, thus the central DC voltage Uc as the EV battery charging voltage base between the pole terminal P1 and the pole terminal P2 is Uc1+Uc2+Uc3; and similarly when the pole terminal P2 and the throw terminal T1 is electrically connected by the actuator A, the actuator A can electrically connect the pole terminal P1 and the throw terminal T4, thus the central DC voltage Uc as the EV battery charging voltage base between the pole terminal P1 and the pole terminal P2 is Uc1+Uc2+Uc3+Uc4. The skilled person shall understand that the EV battery charging voltage base (the central DC voltage Uc) can be also selected as output between one of the five throw terminals except for T1, and thus the various levels of the EV battery charging voltage base can be reached as described above. In addition, one of the pole terminals of the switch P1 can be arranged to be electrically connected to the throw terminal by the actuator A of the switch; and the other of the pole terminals of the switch P2 can be arranged to be electrically connected to the throw terminal directly. The selection of EV battery charging voltage base can also be achieved by only switching among the electrical connections of the pole terminal P1 and the throw terminals T1, T2, T3, T4, T5 by the action of the actuator A while the electrical connection involving pole terminal P2 remains unchanged.

Each of the transformers 42a, 42b, 42c, 42d, 42f, 42g has a primary winding circuit PW and a secondary winding circuit SW, and the primary winding circuit PW can be electrically connected to the external AC power supply. The transformers 42a, 42b, 42c, 42d, 42f, 42g are there for the purpose of electrical isolation (or galvanic isolation) between the inputs of the central converters 40a, 40b, 40c, 40d and the distributed converters 43a, 43b, 43c, 43d, 43f, 43g and thus the input voltages of them are floating with respective to each other.

The distributed converter 43a, 43b, 43c, 43d, 43f, 43g can supply second DC voltage Ud with a level below that of the first DC voltage Uc1, Uc2, Uc3, Uc4. For example, the distributed converters 43a, 43b, 43c, 43d, 43f, 43g can also be of a full bridge, and each of its legs has two series-connected controllable switches; the controllable switches are used for controlling the commutation of the legs with certain switching pattern (for example. firing angle control, modulation index control, etc.) set by a third controller (not shown) to supply a second DC voltage Ud positive or negative. For example, 6-pulse thyristor based Line Commutated Converter (LCC) can be used as the distributed converters 43a, 43b, 43c, 43d, 43f, 43g. The thyristor based converter is used as the distributed converters 43a, 43b, 43c, 43d, 43f, 43g, not only for the large current capability, but also for blocking reversing current from the EV battery (unidirectional current characteristic of thyristor) and the larger DC voltage adjustment capabilities. A thyristor converter can generate either positive or negative DC voltages (depending on the operation mode: as rectifier or as inverter), which means the battery voltage in EV can be either higher or lower than the first DC voltage V1. As alternative, the similar function could be also realized by IGBT based converter (for example 2-quadant H bridge VSC converter, but more semiconductors (with high current low voltage) are needed). The distributed converter 43a, 43b, 43c, 43d, 43f, 43g has an AC side electrically connected to the secondary winding circuit SW of the corresponding one of the transformers 42a, 42b, 42c, 42d, 42f, 42g, and it has a DC side electrically connected to the central DC output of the corresponding switch 41a, 41b, 41c, 41d, 41f, 41g in series. Depending on its operation mode, as an inverter or rectifier, the power flows from the external AC power supply to the EV battery or vice versa. For example, the central converter 40a, 40b, 40c, 40d can provide stable first DC voltage Uc1, Uc2, Uc3, Uc4, assuming Uc1=Uc2=Uc3=Uc4=200V. The distributed converters 43a, 43b, 43c, 43d, 43f, 43g can supply second DC voltage Ud, assuming Ud=+100V (rectifier mode) or −100V (inverter mode) below the level of Uc1, Uc2, Uc3, or Uc4. The third controller being connected to the corresponding one of the distributed converter 43a, 43b, 43c, 43d, 43f, 43g, can control the switching pattern thereof in consideration charging command, value of the charging current, and the value of the central DC voltage. Battery voltage varies during EV battery charging process. To follow the charging command, which could be current command or voltage command, the third control will adjust the switching pattern continuously leading to a changed Ud. This may cause distributed converters away from designed operation point, resulting in increased power loss. However the central converter will be maintained in a high performance operation point (high efficiency, low AC harmonic, etc). Considering the power ratio between distributed converter and central converter, total power loss is still lower comparing to existing EV charger.

For example, The third controller can set the switching pattern of the corresponding one of the distributed converter 43a, 43b, 43c, 43d, 43f, 43g so that it operates in rectifier mode supplying a positive voltage at its DC side if EV battery voltage is above the charging voltage during start-up, or set the start-up switching pattern of the corresponding one of the distributed converter 43a, 43b, 43c, 43d, 43f, 43g so that it operates in inverter mode supplying a negative voltage at its DC side if EV battery voltage is below the charging voltage. This renders that the EV battery charging system can reach the system dynamic balance more quickly.

The first controller is connected to the switch 41a, 41b, 41c, 41d, 41f, 41g, so that the switch of electrical connection between the pole terminals P1, P2 and the throw terminals T1, T2, T3, T4, T5 of the respective one of the switches 41a, 41b, 41c, 41d, 41f, 41g is controlled so as to supply a combination of the central DC voltage Uc and the second DC voltage Ud as a charging voltage for the battery of the corresponding electric vehicle. For example, the first controller can switch on the electrical connection between the pole terminals P1, P2 and the throw terminals T1, T2, T3, T4, T5 of the corresponding switch 41a, 41b, 41c, 41d, 41f, 41g so that the central DC voltage Uc as the EV battery charging voltage base falls under a predetermined range of the nominal charging voltage for the battery of the corresponding electric vehicle. For example, if the predetermined range of the nominal charging voltage for the battery is 0-100V, then the central DC voltage Uc needs to be selected as 0V. Accordingly, none of the central converters is selected for supplying the EV battery charging voltage base, and it follows switching on the electrical connection between the pole terminals P1, P2 and the throw terminal T1 of the switch. The third controller can control the distributed converter to operate in a rectifier mode. Thus, a combination of the central DC voltage Uc and the second DC voltage Ud falls under battery charging range of 0-100V. Similarly, the various states are summarized as in the table I below:

TABLE I

| Battery charging voltage range [V] | Switching-on of throw terminal | Operation mode of distributed converter |
|---|---|---|
| 0~100 | T1 | Rectifier |
| 100~200 | T2 | Inverter |
| 200~300 | T2 | Rectifier |
| 300~400 | T3 | Inverter |
| 400~500 | T3 | Rectifier |
| 500~600 | T4 | Inverter |
| 600~700 | T4 | Rectifier |
| 700~800 | T5 | Inverter |
| 800~900 | T5 | Rectifier |

Due to the serial connection of the central DC voltage Uc and the second DC voltage Ud, the EV battery charging voltage can be supplied in the range of −100V to +900V with various switching situations of the switches 41a, 41b, 41c, 41d, 41f, 41g. Thus, vehicles with various nominal voltages can be charged simultaneously. Besides, by having the electrical vehicle battery charging system according to FIG. 4, the total number of the electrical vehicle battery that can be charged at the same time has correlation with the number of the distributed converters 43a, 43b, 43c, 43d, 43f, 43g. For example, from the illustration of FIG. 4, the number of the distributed converters 43a, 43b, 43c, 43d, 43f, 43g is six, and the total number of the electrical vehicle battery is six. The skilled person should understand the number of the distributed converters 43a, 43b, 43c, 43d, 43f, 43g may be equal to or above one, so forth with the number of the electrical vehicle battery. Assuming the required charging capacity for the electrical vehicle battery is 50 kW and the number of electrical vehicle battery can be charged at the same time is six, the total charging capacity for the system is 50 kW×6=300 kW. As above mentioned, electrical power is supplied via the central converters 40a, 40b, 40c, 40d and the distributed converters 43a, 43b, 43c, 43d, 43f, 43g in parallel to the electrical vehicle batteries, the system total capacity can be distributed among the central converters 40a, 40b, 40c, 40d and the distributed converters 43a, 43b, 43c, 43d, 43f, 43g. For example, the capacity for the central converters 40a, 40b, 40c, 40d may amount to 270 kW, and the capacity for each of the distributed converters 43a, 43b, 43c, 43d, 43f, 43g may amount to 5 kW. As compared with the conventional electrical vehicle battery charging station with charging capacity of 50 kW×6=300 kW, the total capacity of the converters according to the embodiment of present invention is lowered at 300 kW that is smaller than that of 600 kW of the conventional. In summary, the EV battery charging system of present invention is helpful for decreasing the converter capacity while maintaining the charging capacity. It follows that the EV battery charging system cost involving power conversion is reduced.

Figure 5:
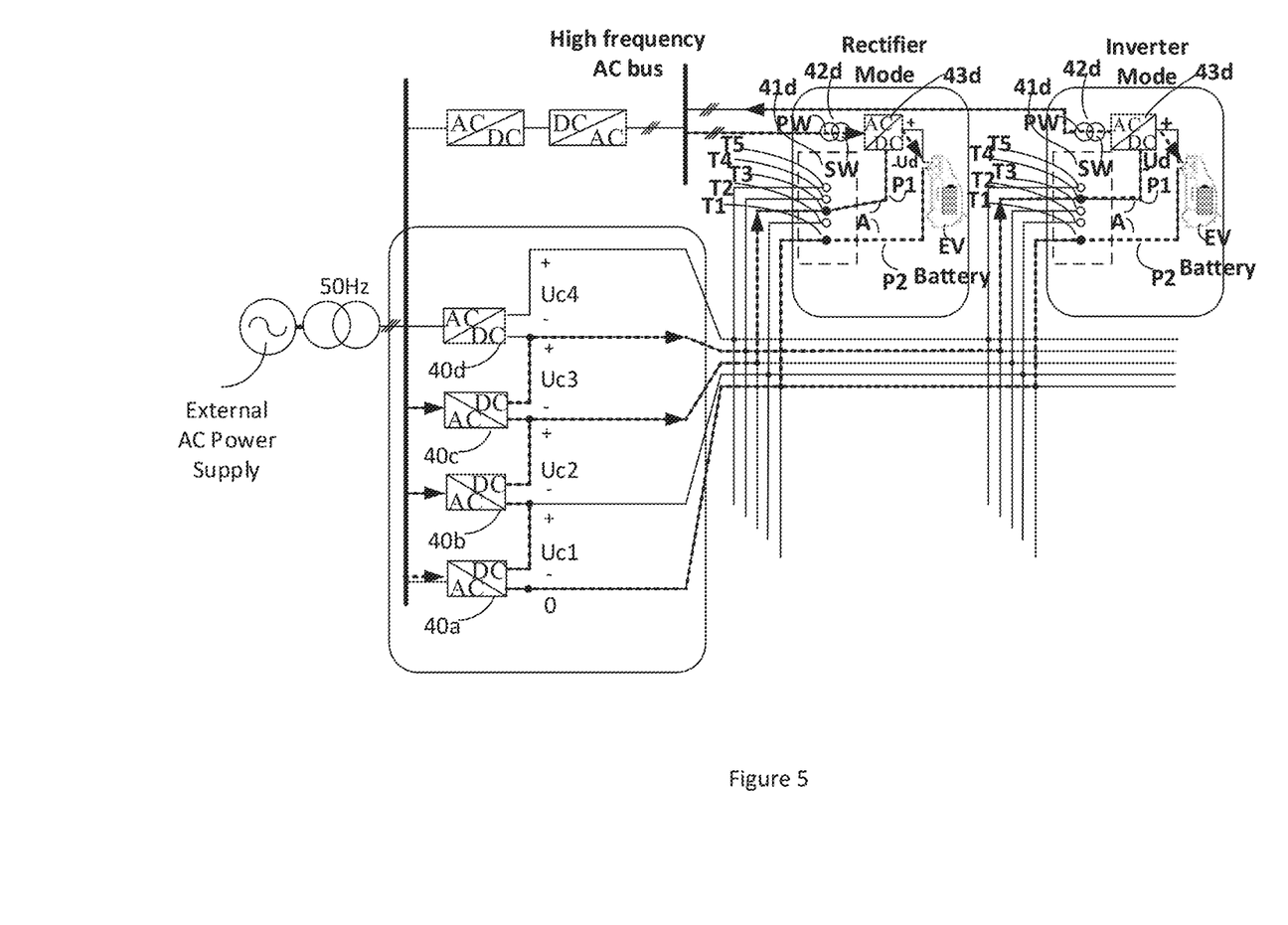
FIG. 5 shows a combination of the first converter and of the second converters according to an embodiment of present invention.

FIG. 5 shows a combination of the central converters and distributed converters according to an embodiment of present invention. The EV battery charging system according to FIG. 5 differs from that according to FIG. 4 in that: it further comprises at least one converter 45, being adapted for converting frequency of the external AC power supply to a high-frequency AC power and supplying the converted high-frequency AC power to the corresponding one of the transformers 42a, 42b, 42c, 42d, 42f, 42g. For avoidance of redundancy, FIG. 5 only keeps two distributed converters 43d, 43f. The transformer v and the distributed converter 43a, 43b, 43c, 43d, 43f, 43g are operable at the high frequency. The characteristic of high frequency allows the usage of the transformers in less footprint/weight/cost. The arrow A1 shows the power flow direction where, for example, the distributed converter 43d operates in a rectifier mode, while the arrow A2 shows the power flow direction where the distributed converter 43f operates in an inverter mode.

In addition, the skilled person shall understand that the controllers referred by the first controller, the second controller and the third controller can be controlling modules that are distributed and implemented in different hardware or can be implemented centrally in one hardware.

Though the present invention has been described on the basis of some preferred embodiments, those skilled in the art should appreciate that those embodiments should by no way limit the scope of the present invention. Without departing from the spirit and concept of the present invention, any variations and modifications to the embodiments should be within the apprehension of those with ordinary knowledge and skills in the art, and therefore fall in the scope of the present invention which is defined by the accompanied claims.

The invention claimed is:
1. A system for charging a battery of at least one electric vehicle, comprising:
   a plurality of central converters, each of the plurality of central converters having an AC input electrically connectable to an external AC power supply, each of the plurality of central converters having a DC output, and the DC outputs of the plurality of central converters being serially connected;
   at least one switch, each of the switches having a plurality of throw terminals being respectively electrically connected to terminals of the DC outputs of the plurality of central converters, each of the switches having two pole terminals, and each of the switches having an actuator for switching between electrical connection of one of the pole terminals and one of the plurality of throw terminals and that of the one of the pole terminals and another of the plurality of throw terminals so as to selectively supplying a voltage at a central DC output between the two pole terminals as a central DC voltage;
   at least one transformer, each of the transformers having a primary winding circuit and a secondary winding circuit, and the primary winding circuit being electrically connected to the external AC power supply;
   at least one distributed converter for supplying at least one distributed DC voltage with a level below that of at least one of the plurality of central converters, each of the distributed converters having an AC side electrically connected to the secondary winding circuit of the corresponding one of the transformers, each of the distributed converters having a DC side electrically connected to the central DC output of the corresponding switch in series; and a first controller connected to the at least one switch, so that the actuator of electrical connection between the pole terminal and the plurality of throw terminals of the respective one of the at least one switches is controlled so as to supply a combination of the central DC voltage and the distributed DC voltage as a charging voltage for the battery of the corresponding electric vehicle.

2. The system for charging a battery of at least one electric vehicle according to claim 1, wherein:

one of the pole terminals of the switch is arranged to be electrically connected to the throw terminal by the actuator of the switch; and the other of the pole terminals of the switch is arranged to be electrically connected to the throw terminal directly.

3. The system for charging a battery of at least one electric vehicle according to claim 1, wherein:

both of the pole terminals of the switch are arranged to be electrically connected to the throw terminals of the switch by the actuator of the switch.

4. The system for charging a battery of at least one electric vehicle according to claim 1, further comprising:

a second controller connected to the plurality of central converters, be adapted for controlling a switching pattern of each of the plurality of central converters so that at each of the outputs of the plurality of central converters a stable DC voltage is supplied.

5. The system for charging a battery of at least one electric vehicle according to claim 1, wherein:

the first controller is further adapted for controlling an action of the actuator of the corresponding switch so that the central DC voltage falls under a predetermined range of a nominal charging voltage for the battery of the corresponding electric vehicle.

6. The system for charging a battery of at least one vehicle according to claim 1, further comprising:

at least one other converter, being adapted for converting frequency of the external AC power supply to a high-frequency AC power and supplying the converted high-frequency AC power to the corresponding one of the at least one transformer;

wherein:

the transformer and the distributed converter are operable at the high frequency.

7. The system for charging a battery of at least one electric vehicle according to claim 1, further comprising:

another controller being connected to the corresponding one of the at least one distributed converter, being adapted for controlling a switching pattern of the corresponding one of the at least one distributed converter in consideration charging command, value of the charging current and the central DC voltage.

8. The system for charging a battery of at least one electric vehicle according to claim 7, wherein:

the another controller is further adapted for setting the switching pattern of the corresponding one of the at least one distributed converter so that it operates in rectifier mode supplying a positive voltage at its DC side if EV battery voltage is above the charging voltage during start-up.

9. The system for charging a battery of at least one vehicle according to claim 6, wherein:

the at least one third controller is further adapted for setting the switching pattern of the corresponding one of the at least one distributed converter so that it operates in inverter mode supplying a negative voltage at its DC side if EV battery voltage is below the charging voltage during start-up.

10. The system for charging a battery of at least one electric vehicle according to claim 2, wherein:

the first controller is further adapted for controlling an action of the actuator of the corresponding switch so that the central DC voltage falls under a predetermined range of a nominal charging voltage for the battery of the corresponding electric vehicle.

11. The system for charging a battery of at least one vehicle according to claim 2, further comprising:

at least one other converter, being adapted for converting frequency of the external AC power supply to a high-frequency AC power and supplying the converted high-frequency AC power to the corresponding one of the at least one transformer;

wherein:

the transformer and the distributed converter are operable at the high frequency.

12. The system for charging a battery of at least one electric vehicle according to claim 2, further comprising:

another controller being connected to the corresponding one of the at least one distributed converter, being adapted for controlling a switching pattern of the corresponding one of the at least one distributed converter in consideration charging command, value of the charging current and the central DC voltage.

* * * * *